J. C. McLAUGHLIN.
TYPE WRITING MACHINE.
APPLICATION FILED MAY 5, 1908.
927,425.
Patented July 6, 1909.
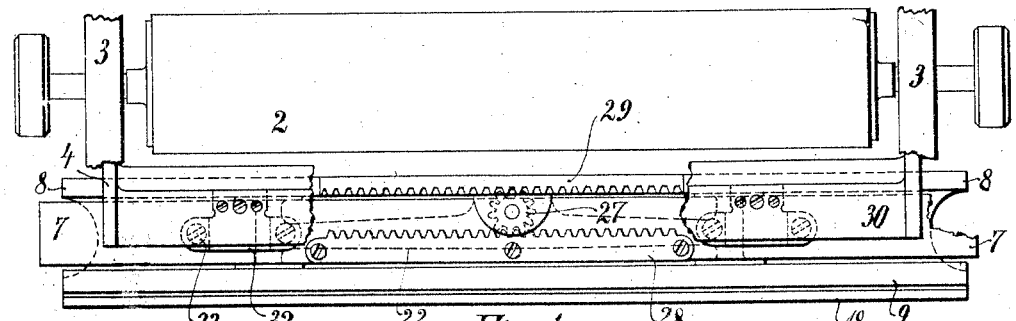
Fig. 1.
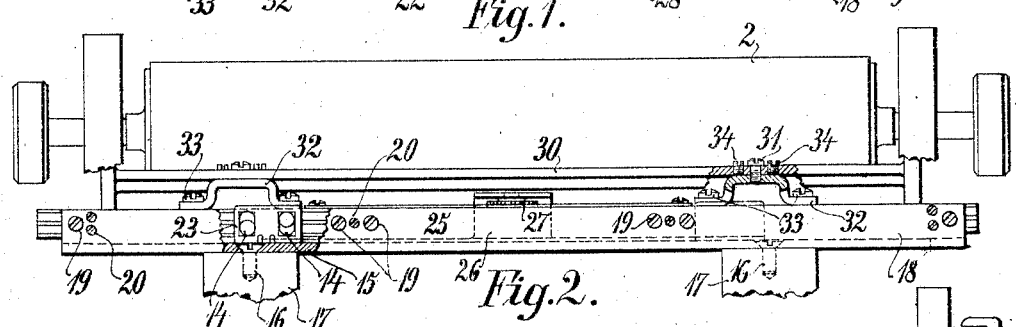
Fig. 2.
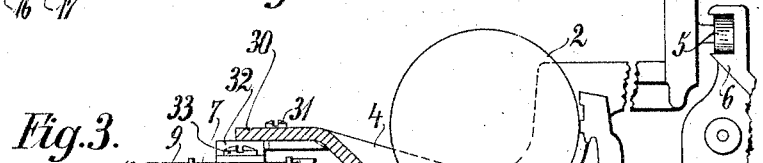
Fig. 3.
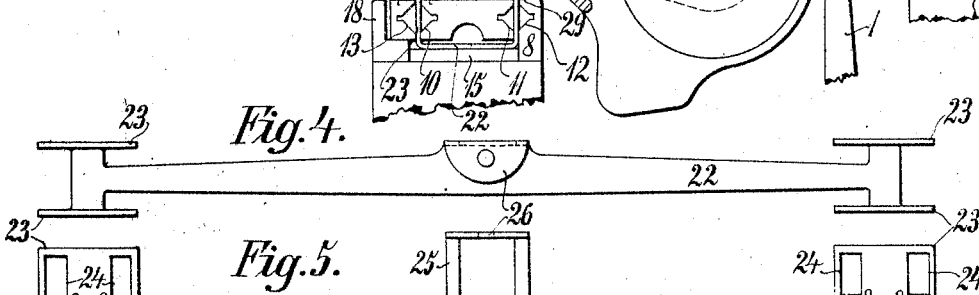
Fig. 4.
Fig. 5.
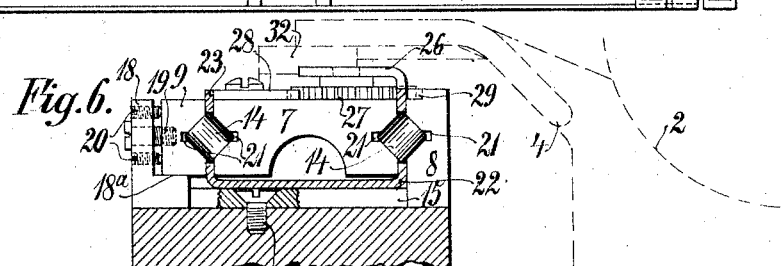
Fig. 6.
Witnesses
W. Fritz
John O. Seifert
Inventor
John C. McLaughlin
By B. C. Stickney
Attorney.

UNITED STATES PATENT OFFICE.

JOHN C. McLAUGHLIN, OF JERSEY CITY, NEW JERSEY, ASSIGNOR TO UNDERWOOD TYPEWRITER COMPANY, OF NEW YORK, N. Y., A CORPORATION OF NEW JERSEY.

TYPE-WRITING MACHINE.

No. 927,425.  Specification of Letters Patent.  Patented July 6, 1909.

Application filed May 5, 1908. Serial No. 430,920.

*To all whom it may concern:*

Be it known that I, JOHN C. McLAUGHLIN, a citizen of the United States, residing in Jersey City, in the county of Hudson and State of New Jersey, have invented certain new and useful Improvements in Type-Writing Machines, of which the following is a specification.

This invention relates to means for supporting and guiding the carriages of typewriting machines.

The principal object of the invention is to provide simple, readily adjustable, reliable and inexpensive means for guiding the carriage accurately while permitting it to run freely.

In carrying out the invention, I provide upon the machine frame a pair of rails having opposite grooves, and I secure to the carriage a truck which is confined between the rails and provided with complementary grooves. The grooves are so shaped and placed as to form races which are rectangular in cross-section; and in these races I place rollers, in pairs, two pairs in each race, one pair at each end of the truck, the rollers in each pair being set with their axes at right angles, whereby freedom of movement and rigidity of the carriage against vibration are assured. The adjustable rail is set by means of holding screws and set screws, so as to get a close fit of the races to the rollers. I employ a channel member, one side or wall of which has a groove and constitutes one of the rails, while the other wall contains the screws to adjust and secure the other rail; said channel member being removably secured to the framework for convenience in substituting a short rail and carriage for a long one, and vice versa. The rollers are provided with a spacing-frame of novel construction. The carriage is adjustably secured upon the track, to permit leveling of the platen to secure accuracy of printing.

Other features and advantages will hereinafter appear.

In the accompanying drawings, Figure 1 is a plan and Fig. 2 a rear elevation of a carriage and its guiding means, embodying one form of my invention. Fig. 3 is a diagrammatic end elevation of the same. Fig. 4 is a plan and Fig. 5 an elevation of a ball-spacer. Fig. 6 is a part-sectional end elevation of the carriage truck and rails.

Type bars 1 strike upon the front side of a platen 2 mounted upon a platen frame 3, which is suitably mounted upon a carriage 4 having a front wheel 5 to run upon a track 6, and at its rear end secured to a truck 7, which is confined between a fixed rail 8 and an adjustable rail 9. In the side edges of the truck are formed grooves 10, 11, and in the rails are formed complementary grooves 12, 13, said grooves so shaped and disposed as to form raceways which are square in cross-section. In these raceways run rollers 14, said rollers disposed in pairs, two pairs in each raceway, one pair at each end of the truck, the rollers in each pair being disposed with their axes at right angles, as seen at Fig. 2, whereby great ease and accuracy of movement of the carriage is secured, and rapid wearing away of the parts is avoided.

The rail 8 constitutes one wall of a channel member, the bottom of which 15 is removably secured by screws 16 to the framework 17 of a typewriting machine. In the opposite wall 18 of the channel member are placed headed screws 19, which are threaded into the track or track bar 9; and associated with each of said screws is one or more set screws 20. The headed screws and the set screws are placed in groups at intervals along the wall 18 to adjust the parts of the track 9 and secure an accurate fit of the grooves to the balls or rollers at all points. Wear may be taken up at any point by loosening the screw or screws 19, and setting up the screw or screws 20 to take up the play, and then the screws 19 may be again turned up. The rail 9 is adjustable upon a seat 18ª formed at the base of the wall 18 within the channel member.

Each of the grooves is formed at its apex with a recess or clearance 21 for the edges of the rollers; and the latter are controlled or spaced by a spacer which comprises a sheet-metal bar 22 extending along beneath the truck 7, and having at each of its ends a pair of upturned ears 23, each ear having two cages or racks 24 to receive the rollers 14, said racks preferably in the form of closed eyes. The ears 23 play between the truck and the rails, Figs. 3 and 6. About midway of its length the bar 22 is formed with a plate 25, which extends up between the front rail 8 and the truck, and it is bent at 26 rearwardly over the truck to form an ear, in which is pivoted a pinion 27, the latter running in mesh with a rack 28 fixed upon the truck, and a rack 29 fixed upon the top of the rail 8.

The rear bar 30 of the carriage frame is secured by means of headed screws 31 upon blocks 32, which are removably attached by screws 33 to the top of the track 7. Grouped with each screw 31 are two set screws 34, whereby either end of the carriage frame may be raised to level the platen 2; the screw 31 being then tightened to hold the carriage where it is adjusted. The blocks 32 hold the carriage bar 30 above the pinion ear 26 of the ball-spacer.

Having thus described my invention, I claim:

1. In a typewriting machine, the combination with a fixed rail and an adjustable rail mounted upon the framework of the machine and having opposite grooves, of a carriage having on one side a truck provided upon its opposite edges with grooves to match the rail grooves, rollers in the grooves; the fixed rail forming part of a channel member in which the adjustable rail is confined, said channel member also containing said truck and having at intervals groups of screws to adjust and secure the adjustable rail, and a rail to support the opposite side of said carriage.

2. In a typewriting machine, the combination with a fixed rail and an adjustable rail mounted upon the framework of the machine and having opposite grooves, of a carriage having a truck provided upon its opposite edges with grooves to match the rail grooves, rollers in the grooves, the fixed rail forming part of a channel member in which the adjustable rail is confined, said channel member also containing said truck and having at intervals groups of screws to adjust and secure the adjustable rail, and provided with a seat upon which the adjustable rail is movable, and a rail to support the opposite side of said carriage.

3. In a typewriting machine, the combination with a fixed rail and an adjustable rail mounted upon the framework of the machine and having opposite grooves, of a carriage having a truck provided upon its opposite edges with grooves to match the rail grooves, and rollers in the grooves; the fixed rail forming part of a channel member in which the adjustable rail is confined, said channel member also containing said truck and having at intervals groups of screws to adjust and secure the adjustable rail, screws detachably securing the base of said channel member to the framework of the machine, and a rail to support the opposite side of said carriage.

4. In a typewriting machine, the combination with rails mounted upon the framework and having opposite grooves, of a carriage having a truck confined between the rails and having complementary grooves, rollers running in the grooves, and a spacer for said rollers in the form of a bar extending along the truck and bent up at each of its ends to form roller-engaging ears inserted between the truck and the rails; said bar having between its ends a plate extending up between the truck and one of the rails and bent over the truck to form an ear in which is mounted a pinion, and racks to engage said pinion, one rack stationary and the other upon the truck.

5. In a typewriting machine, the combination with a pair of rails having opposite V-grooves, of a carriage truck between said rails and having complementary V-grooves, said grooves formed to make race-ways of square contour in cross-section, and four pairs of rollers running in the race-ways, two pairs upon each side of the truck, one pair at each end thereof, the rollers in each pair being arranged with their axes at right angles to each other, and a spacer for said rollers, said spacer comprising a bar extending along the truck and having at its ends ears bent up and formed into cages or racks having openings within which the rollers are confined.

6. In a typewriting machine, the combination with a pair of grooved rails, a truck confined between the rails, rollers running in the grooves, and a platen carriage, of screws connecting the carriage to the truck, and set screws coöperating with said connecting screws to level and secure the carriage and aline the platen; said carriage being secured by said screws upon blocks which are fixed by screws to said truck.

JOHN C. McLAUGHLIN.

Witnesses:
JOHN C. SEIFERT,
KITTIE FRANKFORT.